Oct. 13, 1959  O. W. HOLDEN  2,908,519
BALL AND SOCKET JOINT
Filed May 14, 1957
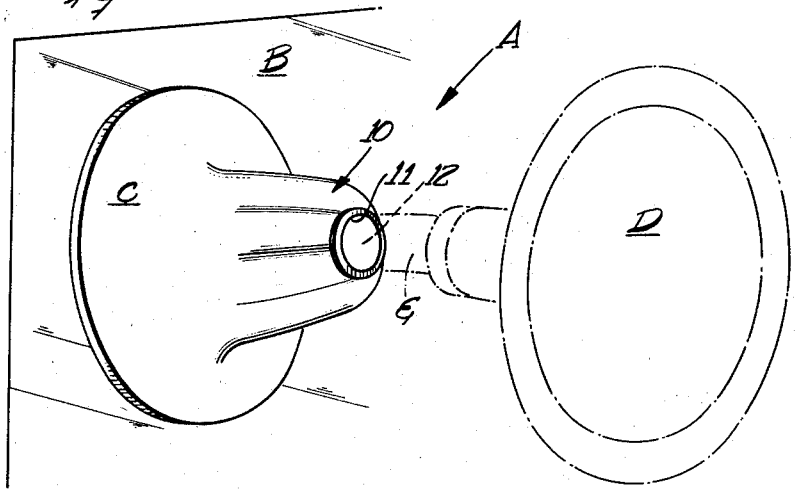
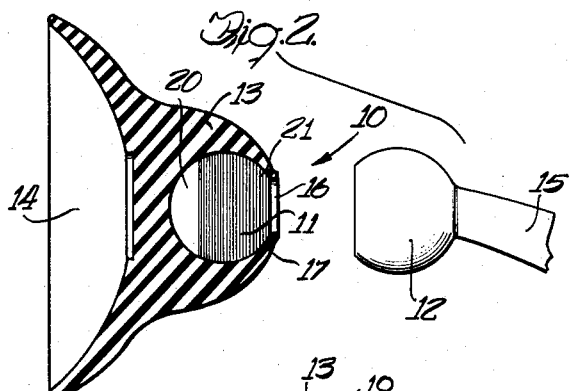
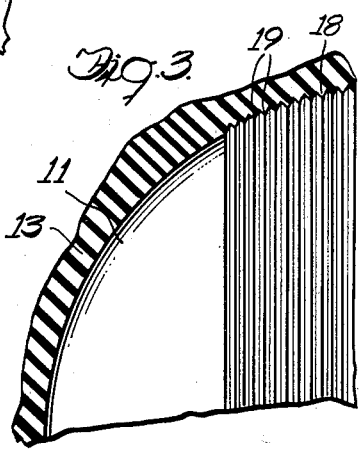
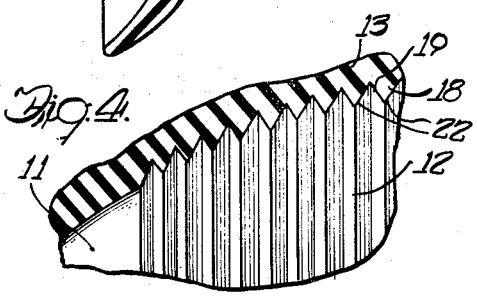
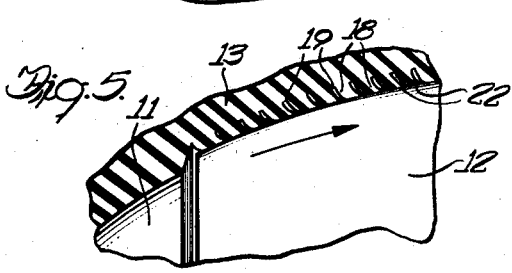
Inventor
Orloff W. Holden
Dalbert U. Shefte
Attorney

United States Patent Office 2,908,519
Patented Oct. 13, 1959

2,908,519

BALL AND SOCKET JOINT

Orloff W. Holden, Chicago, Ill., assignor to Orloff W. Holden and Marguerite H. Holden, a partnership doing business as Knickerbocker Rubber Company, Not Inc.

Application May 14, 1957, Serial No. 659,125

3 Claims. (Cl. 287—87)

This invention relates to a new and improved ball and socket joint. More particularly, the present invention relates to a ball and socket joint having resilient ridges and associated grooves formed in the socket for sealing a lubricant therein and for yieldably supporting the ball.

The ball and socket joint has been extensively used to connect a pivotal member to a member formed of resilient material such as a pliable plastic. An example of such use is shown in Figure 1 where a mirror holder A is detachably mounted on a supporting structure, such as a flat mirror B by means of a suction cup C. To permit adjustment of the position of the magnifying mirror D, a ball and socket joint 10 is provided with a socket 11 formed in the suction cup portion and a ball 12 formed at the end of the adjustable portion E.

This type of joint has proven to be satisfactory but without the aid of a lubricant, the friction of the ball against the plastic or rubber socket may at times be difficult to overcome. To eliminate this, a lubricant is often used but the lubricant has a tendency to work away from the contiguous surfaces leaving the joint only slightly more workable than when no lubricant is employed. Also, the lubricant has a tendency to seep out of the opening further reducing its effectiveness.

The present invention provides a structure designed to overcome the above difficulties by including a system of ridges and grooves in the socket to seal the lubricant therein, and in addition, to facilitate manipulation of the joint by flexing the ridges. The grooves serve as reservoirs for the retention of a lubricant which is dammed in the grooves by the ridges. The ridges extend into the socket and are formed of yieldable material so that movement of the ball displaces the ridges, thereby increasing the effective diameter of the socket and permitting easier manipulation of the ball.

The principal object of the present invention is to provide a new and improved ball and socket joint.

Another object of the present invention is to provide a new and improved lubricated ball and socket joint having grooves formed in the socket to serve as a reservoir for the retention of a lubricant.

A further object of the present invention is to provide a new and improved ball and socket joint having resilient ridges formed in the socket for yieldably supporting the ball.

Still another object of the present invention is to provide a new and improved ball and socket joint as described in the preceding paragraph wherein the ridges are parallel to each other and are parallel to the socket opening.

A still further object of the present invention is to provide a new and improved ball and socket joint as described in the preceding paragraphs wherein the socket is spherically shaped and the ball is partially spherically shaped to permit universal adjustment of the ball in the socket.

Other and further objects and advantages of the present invention will be apparent from the following description and drawings in which:

Fig. 1 is a perspective view of one application of an embodiment of the present invention shown as a magnifying mirror holder attached to a flat mirror;

Fig. 2 is a partial vertical sectional view of the structure of Fig. 1 shown with the ball removed from the socket;

Fig. 3 is an enlarged vertical sectional view of a portion of Fig. 2 showing the ridges and grooves more clearly;

Fig. 4 is an enlarged vertical sectional view of a portion of Fig. 2 with the ball at rest in the socket; and Fig. 5 is a view similar to Fig. 4 with the ball rotated so as to flex the ridges.

While the invention is susceptible of embodiments in many different forms, there is shown in the drawings and will herein be described in detail a single embodiment with the understanding that the present disclosure is to be considered as an exemplification of the principles of the invention and is not intended to limit the invention to the embodiment illustrated. The scope of the invention will be pointed out in the appended claims.

Referring now to the drawings and in particular Figs. 2–5, the ball and socket joint is generally indicated as 10 consisting of a socket 11 and a ball 12 engageable therein. The socket 11 is formed in a socket portion 13 which, except for the socket itself, can be of any desired shape depending on the use to which it is put, for purposes of exemplification, the socket portion is shown to have a suction cup 14 formed therein for attachment to a supporting structure such as the flat mirror B seen in Fig. 1. Similarly, the ball 12 can be formed on any desired member depending on the use to which it is adapted. The example illustrated shows such member to be a mirror support 15 which is adjustable by manipulation of the ball and socket joint to adjust the position of a mirror, such as the magnifying mirror D shown in Fig. 1.

The socket portion 13 is shown to be formed of a resilient material, such as a pliable plastic or a semi-soft rubber. This is not to be considered a limitation on the invention as it is obvious the reason the socket portion 13 is resilient is because of the suction cup 14. Similarly, the ball 12 could be formed of any material which is sufficiently rigid to frictionally engage in the socket so as to remain in any adjusted position.

In Fig. 2 it is seen that the socket 11 is spherically shaped and has a circular socket opening 16 for the receipt of the ball 12. This opening 16 is of a lesser diameter than the diameter of the socket so that the ball 12, which has a diameter approximating that of the socket, may be retained within the socket. Surrounding the opening 16 is an annular rim 17 of pliable material which may be simply a thinner portion of the resilient socket portion 13. This pliable rim is provided to permit increasing the effective size of the opening 16 for forcible insertion of the ball 12 therein, the rim being displaced by the ball until the ball is wholly within the socket and manipulated slightly to permit the rim to reflex to its original shape.

As described up to this point, the joint 10 would have a friction fit between the surface of the socket and the surface of the ball which is sufficient to hold the ball in any adjusted position. However, as explained above, this frictional resistance may be sufficient to hinder the manipulation of the ball in the socket. To overcome this, a lubricant (not shown) may be added but because of the smooth surfaces, the lubricant has a tendency to move away from the contiguous surfaces, part of the lubricant accumulating in the inner recess 20 of the socket and part of the lubricant seeping through the opening 16. To prevent the escape of lubricant and to permit easier manipulation of the joint, the present invention provides a plurality of ridges 18 and associated grooves 19 formed in the interior surface of the socket 12. These ridges and grooves can be formed by serrating the interior of the socket after it is formed, or the ridges and grooves can be formed when the socket portion 13 is initially molded. The ridges and grooves are parallel to each other and are also parallel to the opening 16 so that a lubricant, which is retained in the grooves 19, will not have a passage to the opening and therefore will be sealed in the grooves. To further prevent seepage through the opening 16, the ridges and grooves extend only to a point 21 spaced from the opening.

Figs 4 and 5 show the ridges and grooves in a magnified manner so that their function and operation can be understood more clearly. Thus in Fig. 4, it is seen that the ridges 18 extend somewhat radially inwardly, each ridge having an inner apex 22 which is in contact with the ball 12 and form dams to seal the lubricant in the grooves 19. When the ball 12 is rotated, as seen in Fig. 5, the ridges 18 are flexed in the direction of movement of the ball. This flexure of the ridges 18 displaces the apexes from the radial position to a somewhat tangential position. This reduces the height of the ridges with a resulting slight increase in the diameter of the socket reducing the pressure on the ball 12 thereby reducing the frictional resistance to the manipulation of the joint.

Also, this flexure of the ridges 19 permits an initial movement of the ball 12 without friction, as there is no relative movement of the apexes and the contiguous surface of the ball. It is the initial friction which often binds a ball and socket joint, and by eliminating this initial friction, there is little tendency of the present ball and socket joint to become locked.

Further, the flexure of the ridges 18, as seen in Fig. 5, reduces the size of the grooves 19 thereby squeezing lubricant between the apexes and the contiguous surface of the ball 12 to further reduce the frictional resistance to manipulation of the joint.

Thus from the above, it is apparent that the present invention results in a substantial improvement over the existing ball and socket joints by both providing a lubricant seal and additional facilitating manipulation of the joint by providing resilient ridges for the support of the ball which flex upon manipulation of the joint.

I claim as my invention:

1. A ball and socket joint, comprising: a socket member having a socket formed therein; a movable member having a ball on one end thereof, said ball being shaped to be engageable in said socket; and a plurality of yieldable ridges formed on the interior of the socket and frictionally gripping said ball for support of the ball in different positions of adjustment in the socket, said ridges yielding upon movement of the ball in the socket to facilitate manipulation of the ball in the socket and changes in its position relative to the ridges.

2. A ball and socket joint, comprising: a socket member having a socket formed therein; a movable member having a ball on one end thereof, said ball being shaped to be engageable in said socket; and a plurality of resilient ridges formed in the interior surface of the socket for support of the ball when engaged in the socket, said ridges flexing during movement of the ball in the socket to facilitate manipulation of the ball and reflexing to grip the ball frictionally and thereby retain the ball in its adjusted positions when movement of the ball is stopped.

3. A lubricated ball and socket joint, comprising: a socket member having a socket formed therein; a movable member having a ball at one end thereof, the ball being shaped to be engageable in said socket; and a plurality of parallel resilient ridges and associated grooves formed in the interior surface of said socket, the grooves serving as reservoirs for the retention of a lubricant, the parallel ridges acting as dams to retain the lubricant in the grooves and flexing upon movement of the ball in the socket to facilitate manipulation of the ball while frictionally gripping the ball to retain it in different positions of adjustment after such movement.

References Cited in the file of this patent

UNITED STATES PATENTS

| | | |
|---|---|---|
| 1,300,023 | Riegel | Apr. 8, 1919 |
| 1,872,259 | Eldridge | Aug. 16, 1932 |
| 1,902,667 | Sanders | Mar. 21, 1933 |
| 1,980,117 | Turner et al. | Nov. 6, 1934 |
| 2,062,290 | Bott | Dec. 1, 1936 |
| 2,578,809 | Ketchum | Dec. 19, 1951 |
| 2,772,104 | Thirty | Nov. 27, 1956 |
| 2,791,454 | Saives | May 7, 1957 |